(12) United States Patent
Roulland et al.

(10) Patent No.: US 8,346,795 B2
(45) Date of Patent: Jan. 1, 2013

(54) SYSTEM AND METHOD FOR GUIDING ENTITY-BASED SEARCHING

(75) Inventors: Frederic Roulland, LeVersoud (FR); Stefania Castellani, Meylan (FR); Antonietta Grasso, Grenoble (FR); Caroline Brun, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 219 days.

(21) Appl. No.: 12/720,900

(22) Filed: Mar. 10, 2010

(65) Prior Publication Data

US 2011/0225155 A1 Sep. 15, 2011

(51) Int. Cl.
*G06F 17/30* (2006.01)
(52) U.S. Cl. ........ 707/766; 707/706; 707/713; 707/723; 707/737; 707/748; 715/712
(58) Field of Classification Search .................. 707/706, 707/713, 723, 737, 748, 999.001, 766; 715/712
See application file for complete search history.

(56) References Cited

U.S. PATENT DOCUMENTS

| | | | |
|---|---|---|---|
| 6,006,225 A * | 12/1999 | Bowman et al. | 1/1 |
| 6,263,335 B1 | 7/2001 | Paik et al. | |
| 6,366,908 B1 * | 4/2002 | Chong et al. | 1/1 |
| 6,405,162 B1 | 6/2002 | Segond et al. | |
| 6,728,702 B1 * | 4/2004 | Subramaniam et al. | 1/1 |
| 7,058,567 B2 | 6/2006 | Aït-Mokhtar et al. | |
| 7,822,189 B2 * | 10/2010 | Rana et al. | 379/218.01 |
| 7,890,526 B1 * | 2/2011 | Brewer et al. | 707/767 |
| 8,112,432 B2 * | 2/2012 | Zhou et al. | 707/768 |
| 2007/0179776 A1 | 8/2007 | Segond et al. | |
| 2007/0192085 A1 | 8/2007 | Roulland et al. | |
| 2007/0233656 A1 * | 10/2007 | Bunescu et al. | 707/3 |
| 2008/0071519 A1 | 3/2008 | Brun et al. | |
| 2008/0091408 A1 | 4/2008 | Roulland et al. | |
| 2008/0114743 A1 * | 5/2008 | Venkataraman et al. | 707/3 |
| 2008/0140684 A1 * | 6/2008 | O'Reilly et al. | 707/100 |
| 2008/0306908 A1 * | 12/2008 | Agrawal et al. | 707/3 |
| 2008/0319978 A1 | 12/2008 | Brun et al. | |
| 2009/0089047 A1 | 4/2009 | Pell et al. | |
| 2009/0094019 A1 | 4/2009 | Snow et al. | |
| 2009/0106224 A1 | 4/2009 | Roulland et al. | |

(Continued)

OTHER PUBLICATIONS

Aït-Mokhtar, et al., "Incremental Finite-State Parsing," Proceedings of Applied Natural Language Processing, Washington, Apr. 1997.

(Continued)

*Primary Examiner* — Dennis Truong
(74) *Attorney, Agent, or Firm* — Fay Sharpe LLP (57) ABSTRACT

A system and method are provided for refining a user's query. An entity index, generated from a corpus of text documents, is provided. The entity index includes a set of entity structures, each including a plurality of terms. Each of the terms of an entity structure is a feature of the same entity. Entity structures can be retrieved from the entity index which match at least a portion of the user's query. Clusters of the retrieved entity structures are identified which have at least one of their terms in common. A cluster hierarchy is generated from the identified clusters in which nodes of the hierarchy are defined by one or more of the terms of the retrieved entity structures. At least a portion of the cluster hierarchy is presented to the user for facilitating refinement of the user's query through user selection of a node which, when formulated as a search, retrieves one or more responsive documents from the corpus of documents.

23 Claims, 6 Drawing Sheets

U.S. PATENT DOCUMENTS

| | | | |
|---|---|---|---|
| 2009/0150388 A1* | 6/2009 | Roseman et al. | 707/5 |
| 2009/0204596 A1 | 8/2009 | Brun et al. | |
| 2009/0292700 A1 | 11/2009 | Castellani et al. | |
| 2010/0004925 A1* | 1/2010 | Ah-Pine et al. | 704/9 |

OTHER PUBLICATIONS

Aït-Mokhtar, et al., "Subject and Object Dependency Extraction Using Finite-State Transducers," Proceedings ACL'97 Workshop on Information Extraction and the Building of Lexical Semantic Resources for NLP Applications, Madrid, Jul. 1997.

Bast, et al., "Ester: Efficient Search on Text, Entities, and Relations". In Proc. of SIGIR'07, Jul. 23-27, 2007, Amsterdam, pp. 671-678, ACM.

Ehrmann, et al. Vers une double annotation des Entités Nommées, TAL vol. 47 (2006) (in French, with machine translation)—English translation provided.

Pasca M., "Acquisition of Categorized Named Entities for Web Search". In Proc. of CIKM'04, Nov. 8-13, 2004, Washington, DC, USA, pp. 137-145, ACM.

\* cited by examiner

SYSTEM AND METHOD FOR GUIDING ENTITY-BASED SEARCHING

BACKGROUND

The exemplary embodiment relates generally to information retrieval and finds particular application in connection with a system and method which aids users in conducting searches which include named entities and proper nouns.

A named entity or proper noun is a group of one or more words that identifies an entity by name. For example, named entities may include persons (such as a person's given name or title), organizations (such as the name of a corporation, institution, association, government or private organization), locations (such as a country, state, town, geographic region, or the like), artifacts (such as names of consumer products, e.g., vehicle names), specific dates, and monetary expressions. Named entities and proper nouns are typically capitalized in use to distinguish them from ordinary nouns. What distinguishes named entities from proper nouns is generally dependent on the extraction method and lexical resources used in identifying them. For purposes of the present application, both named entities and proper nouns are referred to as "entities".

Various methods exist for identifying a group of words as a named entity or proper noun. These allow the respective entity to be indexed as such when it occurs in a document or corpus of documents. For example, the lexicon WordNet™ is an on-line resource which can be used to identify a group of words as forming a named entity. However, particularly in some domain dependent applications, the entities may not be available in such a resource. Techniques have been developed for automated recognition of proper nouns in text. These methods generally rely on identification of capitalized words which serve as nouns in sentences, but which are not among the list of common nouns.

When searching for information in a collection of documents, users may wish to specify queries as natural language expressions which include named entities or proper nouns. Users may also be interested in searching for information about specific types of named entities, for example about a person or a company. Moreover, users may want to search for entities that can be named in several ways or by attributes that characterize them. When the searches are performed in large collections of documents, the search results can be voluminous and not always relevant to the query. In some contexts, searches are performed in a collaborative fashion, i.e., conducted by a team of users sharing a common task, such as the demonstration of a hypothetical fact. It would be useful for the members of the team to leverage knowledge on the searches performed by the people with which they collaborate.

INCORPORATION BY REFERENCE

The following references, the disclosures of which are incorporated herein in their entireties by reference, are mentioned:

U.S. Pub. No. 2009/0292700, published Nov. 26, 2009, entitled SYSTEM AND METHOD FOR SEMI-AUTOMATIC CREATION AND MAINTENANCE OF QUERY EXPANSION RULES, by Stefania Castellani, et al., discloses a system and method which enable semi-automated generation of query expansion rules for searching a knowledge base. Candidate synonymy pairs are automatically extracted from queries made by users when searching a knowledge base. Synonymy rules are defined, based on the extracted candidate synonymy pairs, and may be context dependent. Query expansion rules based on the defined synonymy rules can then be exported to a storage medium for use in expansion of new user queries when searching the knowledge base.

U.S. Pub. No. 2009/0204596, published Aug. 13, 2009, entitled SEMANTIC COMPATIBILITY CHECKING FOR AUTOMATIC CORRECTION AND DISCOVERY OF NAMED ENTITIES, by Caroline Brun, et al., discloses a system and method for processing text for which named entities have been extracted by a standard named entity system. Attributive relations between a named entity or proper noun and a corresponding attribute are extracted. A concept for the attribute is identified and, in the case of a named entity, compared with the named entity's context, enabling a confirmation or conflict between the two to be determined. In the case of a proper noun, the attribute's context can be associated with the proper noun, allowing the proper noun to be recognized as a new named entity.

U.S. Pub. No. 2009/0106224, published Apr. 23, 2009, entitled REAL-TIME QUERY SUGGESTION IN A TROUBLESHOOTING CONTEXT, by Frederic Roulland, et al., discloses a method for assisting a user to develop a query in a natural language. While the user's natural language query is being entered, a subset of ranked query suggestions from a collection of ranked query suggestions is presented to the user as candidates for user queries. The subset is based on that portion of the user's query already entered. Each of the query suggestions in the collection is formulated to retrieve at least one responsive instance in the knowledge base. The rankings of the query suggestions in the collection are based at least in part on stored logs of prior user sessions in which user queries were input to a search engine for retrieving responsive instances from the knowledge base.

U.S. Pub. No. 2008/0091408, published Apr. 17, 2008, entitled NAVIGATION SYSTEM FOR TEXT, by Frederic Roulland, et al., discloses a computer retrieval system that includes memory which stores instructions for receiving a user's query in a natural language, identifying text strings from an associated knowledge base, each containing at least one expression (word or multi-word expression) which is matched with at least one expression of the user query, and for refining the user's query by representing at least a group of the text strings as a navigation tree in which each of a plurality of selectable nodes comprises an expression representative of at least one syntactic unit in at least one of the identified text strings. Relationships between syntactic units are used in structuring the nodes of the navigation tree.

U.S. Pub. No. 2007/0192085, published Aug. 16, 2007, entitled NATURAL LANGUAGE PROCESSING FOR DEVELOPING QUERIES, by Frederic Roulland, et al., discloses a system suited to self-troubleshooting. Normalized forms of at least some of the words of a natural language user query input by a user are identified. The user query may describe a problem experienced with a machine, such as a printer. Text strings, such as problem statements, are retrieved. Each retrieved problem statement includes at least one word with a normalized form which is recognized as being equivalent to one of the identified normalized forms. Each of the retrieved problem statements may be associated with at least one solution sequence for addressing the problem with the machine. In the event that the stored problem statements in memory are not fully responsive, the processor provides one or more options for refinement of the user query based on tags associated with those words of the problem statements which are responsive.

U.S. Pub. No. 2008/0319978, published Dec. 25, 2008, entitled HYBRID SYSTEM FOR NAMED ENTITY RESOLUTION, by Caroline Brun, et al., discloses a system which is capable of identifying metonymic uses of named entities.

U.S. Pub. No. 2007/0179776, published Aug. 2, 2007, entitled LINGUISTIC USER INTERFACE, by Frederique Segond, et al., discloses a system for retrieval of text which includes a processor which identifies grammar rules associated with text fragments of a text string that is retrieved from an associated storage medium, and retrieves text strings from the storage medium which satisfy the grammar rules.

U.S. Pub. No. 2008/0071519, published Mar. 20, 2008, entitled LABELING OF WORK OF ART TITLES IN TEXT FOR NATURAL LANGUAGE PROCESSING, by Caroline Brun, et al., discloses a system including a detection module which identifies candidate titles of creative works, such as works of art in processed text. A filtering module filters the candidate titles of works to exclude citations of direct speech from the candidate titles of works. A comparison module compares any remaining candidate titles of works with titles of works in an associated knowledge base.

U.S. Pat. No. 6,263,335, entitled INFORMATION EXTRACTION SYSTEM AND METHOD USING CONCEPT-RELATION-CONCEPT (CRC) TRIPLES, by Paik, et al., discloses a system which identifies a predetermined set of relationships involving named entities.

U.S. Pat. No. 7,058,567, issued Jun. 6, 2006, entitled NATURAL LANGUAGE PARSER, by Aït-Mokhtar, et al., discloses a parser for syntactically analyzing an input string. The parser applies a plurality of rules which describe syntactic properties of the language of the input string.

BRIEF DESCRIPTION

In accordance with one aspect of the exemplary embodiment, a method for refining a user's query for entity-based searching includes receiving an input user's query. An entity index generated from a corpus of documents is provided. The entity index includes a set of entity structures, each including a plurality of terms. The terms of an entity structure are features of the same entity. Entity structures are retrieved from the entity index which match the user's query. Clusters of retrieved entity structures which have at least one of their terms in common are identified. A cluster hierarchy is generated from the identified clusters in which nodes of the hierarchy are defined by one or more of the terms of the retrieved entity structures. At least a portion of the cluster hierarchy is presented to the user as a refinement tree for facilitating refinement of the user's query through user selection of a node of the refinement tree which, when formulated as a search, retrieves one or more responsive documents from the corpus of documents.

In another aspect, a system for guiding a user in refining a query for entity-based searching includes an interface for receiving a query input by a user, an entity index which links each of a set of entity structures to terms of the entity structure, an entity structure extraction component which retrieves entity structures from the entity index based on the user query, a cluster generation component which, for retrieved entity structures comprising at least one term which matches the user query, identifies entity clusters, each of the entity clusters comprising a set of terms comprising one or more terms of at least one retrieved entity structure, a set of the retrieved entity structures, a set of parent clusters, and a set of child clusters. A ranking component ranks the identified entity clusters. An entity suggestion component proposes a set of the ranked clusters as a refinement tree linked by paths to their parent and child clusters.

In another aspect, a method for guiding a user in refining a query for entity-based searching, includes receiving a query input by a user. With a processor of a computing device, an entity index is queried, based on the user's query, to retrieve entity structures. Each of the retrieved entity structures includes at least one term which matches at least a part of the user's query. The entity index links each of a set of entity structures to a respective set of terms. Each set of terms includes a plurality of terms. At least some of the entity structures include both a first term which is a name or title of an entity and at least a second term descriptive of the entity. Entity clusters are generated from the retrieved entity structures. Each of the entity clusters includes a set of one or more terms of at least one retrieved entity structure, a set of entity structures, a set of parent clusters, and a set of child clusters. The identified entity clusters are ranked. A ranked cluster hierarchy is generated from the entity clusters in which entity clusters are linked to their parent and child entity clusters. At least a portion of the ranked cluster hierarchy is presented as a refinement tree which is navigable by the user to refine the query.

DETAILED DESCRIPTION

The exemplary embodiment relates to a system and method for guiding entity-based searches such as searches for information related to named entities or other proper nouns (collectively, "entities"). It finds particular application in connection with searches conducted on large collections of documents. The system and method allow a user to specify queries as expressions in natural language, or as a set of keywords, which include entities. The system and method also allow entities to be searched by attributes that characterize them without the user being faced with a long list of results. In some aspects, particularly those where searches are done in a collaborative fashion, e.g., conducted by a team of users sharing a common task, such as the demonstration of a hypothetical fact, the exemplary system and method enable members of the team to leverage knowledge on the searches performed by the people with which they collaborate.

The exemplary method relies on the creation of an entity index. The entity index indexes entities according to terms of "entity structures" which enables a link to be created to the document(s) referencing them, e.g., via a document index. Using the entity index, a representation of a cluster of named entities can be generated and displayed to a user, which facilitates refinement of a user's query. The method thus supports entity-based searches by a dynamic suggestion of entity clusters built from information extracted from a collection of documents.

For purposes of this application, an "entity" refers to a named entity or proper noun. A "proper noun," can be any text element which serves the function of a noun in a text string but which is not identified as being a common noun, for example, because it is capitalized and/or does not appear in a lexicon of common nouns. A "proper noun" or "proper name" generally represents a unique entity, which generally has a unique referent in the world, as distinguished from common nouns which describe a class of entities. A "named entity" generally comprises a text element which identifies an entity by name and which belongs to a given semantic type. Named entities can thus be proper nouns which are recognized as belonging to the specific class of named entity. In the exemplary embodiment, entities may include persons, organizations, locations, and artifacts.

Person-type entities can be of two types: "name", e.g., Lincoln, Abraham Lincoln, or "Abe" (or other nickname), and "title," e.g., President. A document which includes the word "Lincoln" may refer to Abraham Lincoln or to a type of car. Thus, adding additional features to the entity can be useful in defining a query.

In the exemplary embodiment, the entities are formulated as entity structures. Each entity structure is characterized by a set of terms representing one or more features of the entity. The set of terms for an entity can be extracted from a document in a corpus of documents. A "term" can be any word or multi-word expression relevant to characterize a feature of the entity. Depending on the entity extraction component used, the set of terms for an entity structure may be stored as a text string or as a set of terms bounded by separators, such as commas. In general, at least one of the terms of an entity structure refers to the name or title of the entity, e.g., in the case of a person, a title, a first name, a last name or combination thereof. The entity structures are stored in memory as an entity index.

For at least some of the entity structures in the entity index, at least one of the terms is a descriptive term which refers to the entity, such as an attribute of the respective entity, e.g., the person's role or occupation. This way of modeling entities offers some flexibility with the search, while focusing the search more narrowly without limiting the search to the entity's name or title alone. In the exemplary embodiment, the terms of an entity structure do not need to be structured into types or classes or listed in any particular sequence. However, in one embodiment, terms may be labeled according to whether the term refers to the entity itself, such as the name of the entity (an entity label) or is descriptive of the entity (a descriptive label). The exemplary method also allows multiple entity structures which have been automatically extracted from the same or different documents in the document corpus to refer to the same real world named entity.

In the following description, each entity structure is shown in curly brackets, with the terms separated by commas, e.g., in the format {firstname, lastname, descriptive term1, descriptive term2, etc. . . . } such as {John, Lennon, singer}, although it is to be appreciated that the terms can be placed in any order or combined, such as {singer, John Lennon}.

As noted above, one type of descriptive term which can be used to characterize an entity is an attribute. An "attribute" can be any text element which is generally a state of the named entity, e.g., what the named entity "is" (or other of the verb "to be" such as "was", or "will be"). In general, the attributes are nominal attributes, i.e., comprise a noun. Words that are attributes of a given entity can be automatically identified from text by virtue of the word being in an attributive relation with an identified named entity/proper noun by operation of one or more attributive relationship grammar rules. See, for example, above-mentioned U.S. Pub. No. 2009/0204596 for methods of extracting attributes. For example, from the sentence "John Lennon is a musician", the attribute "musician" can be identified as a term for generating the entity structure {John Lennon, musician}. Similarly, in the sentence "President is a very good camembert cheese", the expression "camembert cheese" is an attribute which can be used to generate the entity structure {President, camembert cheese}. In the domain of biology, entity structures may also be extracted such as {*Saccharomyces cerevisiae*, yeast} which uses the attribute "yeast" as one of its terms.

Modifiers may also be extracted as descriptive terms. For ease of description, descriptive terms which are extracted as modifiers of an entity are considered as attributes.

Other descriptive terms which characterize the entity could be defined, depending on the type of query to be conducted or the domain in which the search is to be made. For example, one type of descriptive term may be an association feature, as in "A works for B," where A refers to the entity, and descriptive term B is the company or organization for which he works and the entity structure could be expressed by {A,B}. For article-type entities, the association feature may be represented by "C is made/sold by D," where term C is an article type of entity and term D is a company which makes or sells C, yielding the entity structure {C,D}. Grammar rules for extracting such features may be defined.

Figure 1:
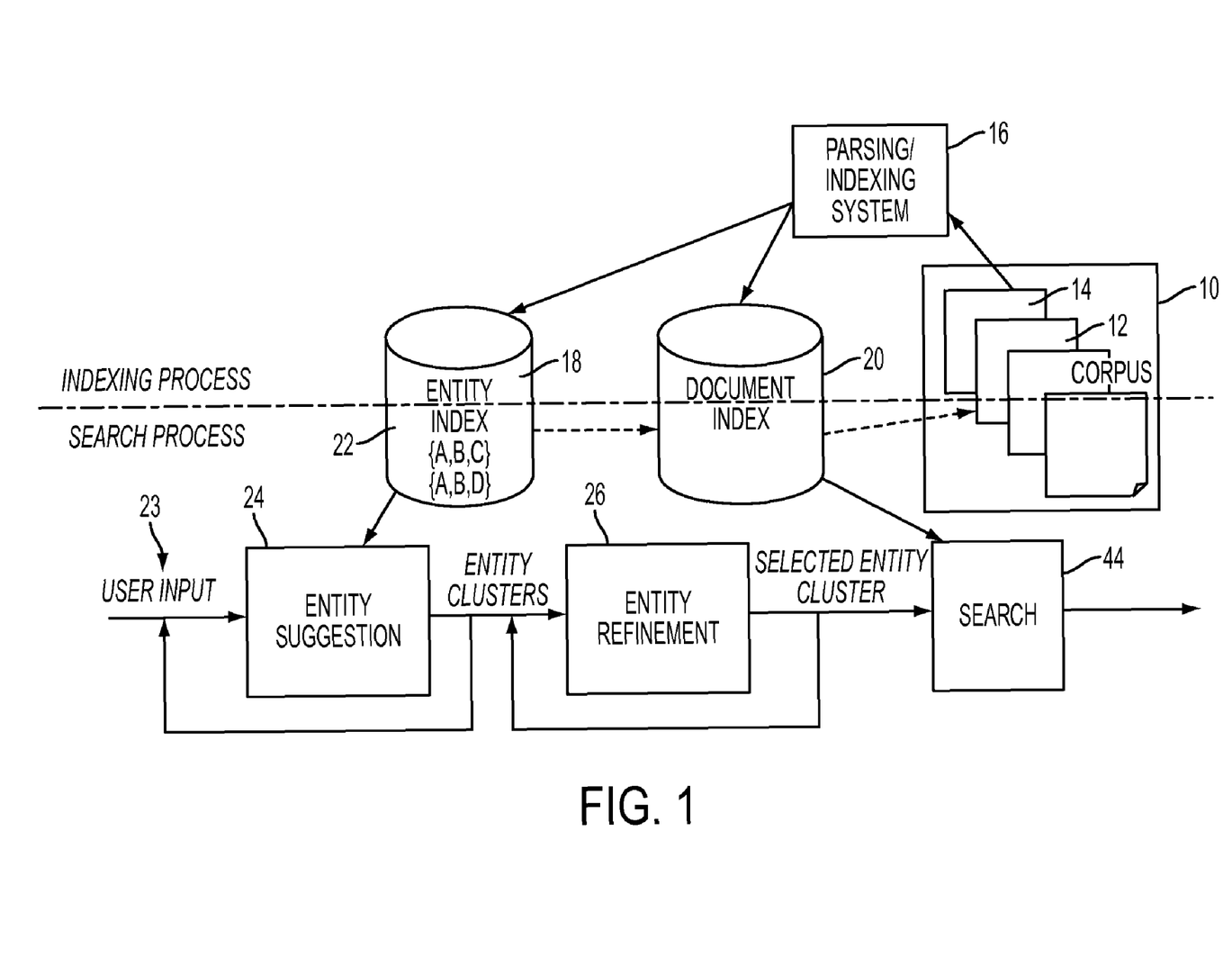
FIG. 1 is a schematic view of a query refinement system and method in accordance with one aspect of the exemplary embodiment.

FIG. 1 provides an overview of the system and method which are described in greater detail below. A collection 10 (or corpus) of documents 12, 14 etc. is accessible to the system. The term "document," as used herein generally refers to a body of text and may be a subpart of a larger document and/or which may also include other information, such as drawings, photographs, and the like. In general, each document 12, 14 comprises one or more text strings expressed in a natural language having a vocabulary and a grammar. Each text string can be as short as a phrase or clause of a sentence and generally comprises a sentence and may comprise two or more contiguous sentences. An input document 12, 14 generally includes a plurality of text strings each comprising a plurality of text fragments, such as words, phrases, numbers, and dates, or combinations thereof. In the case of input XML documents, the searchable text strings may include hidden text.

A parsing and indexing system 16 transforms the documents 12, 14, etc. into an indexed body of annotated, searchable text. Specifically, the parsing and indexing enables the creation of an entity index 18 and a document index 20. In the indexing process, entity structures 22 are extracted by parsing the corpus 10 of documents. Each entity structure 22 is denoted by a set of terms that characterize an entity and is indexed according to each of these terms. Each entity structure 22 includes at least two terms and may include three or more terms. Each term includes at least one word. Although the number of terms which any one entity structure may include is not limited, in general, the majority or all of the entity structures in the entity index will include no more than five terms. The entity index 18 matches terms with the entity structures that include them, e.g., in a matrix. For example, the term "John" may be matched with the entity structures {John, Lennon, musician}, {John, Lennon, songwriter}, {Travolta, John, actor}, and all other entity structures which include the term John.

Table 1 shows a part of an exemplary entity index 18 which could be generated from a corpus 10 of entertainment-related documents.

TABLE 1

| Entity Structure | Terms | | | | | |
|---|---|---|---|---|---|---|
| | John | Lennon | Travolta | musician | Actor | songwriter ... |
| {John, Lennon, musician} | 1 | 1 | 0 | 1 | 0 | 0 |
| {Travolta, John, actor} | 1 | 0 | 1 | 0 | 1 | 0 |
| {Elton, John, musician} | 1 | 0 | 0 | 1 | 0 | 0 |
| {John, Lennon, songwriter} | 1 | 1 | 0 | 0 | 0 | 1 |
| ... | | | | | | |

The document index 20 links the entity structures 22 to the documents which they match by virtue of having been extracted from them. Thus, {John, Lennon, musician} may be linked to a first set of documents in the corpus 10 while {John, Lennon, songwriter} may be linked to a second set of documents, which in some cases may include some of the documents in the first set. Depending on the capabilities of the parsing/indexing system 16, several entities of the index 18 may correspond to one actual entity in the real world, as illustrated in TABLE 1.

Figure 2:
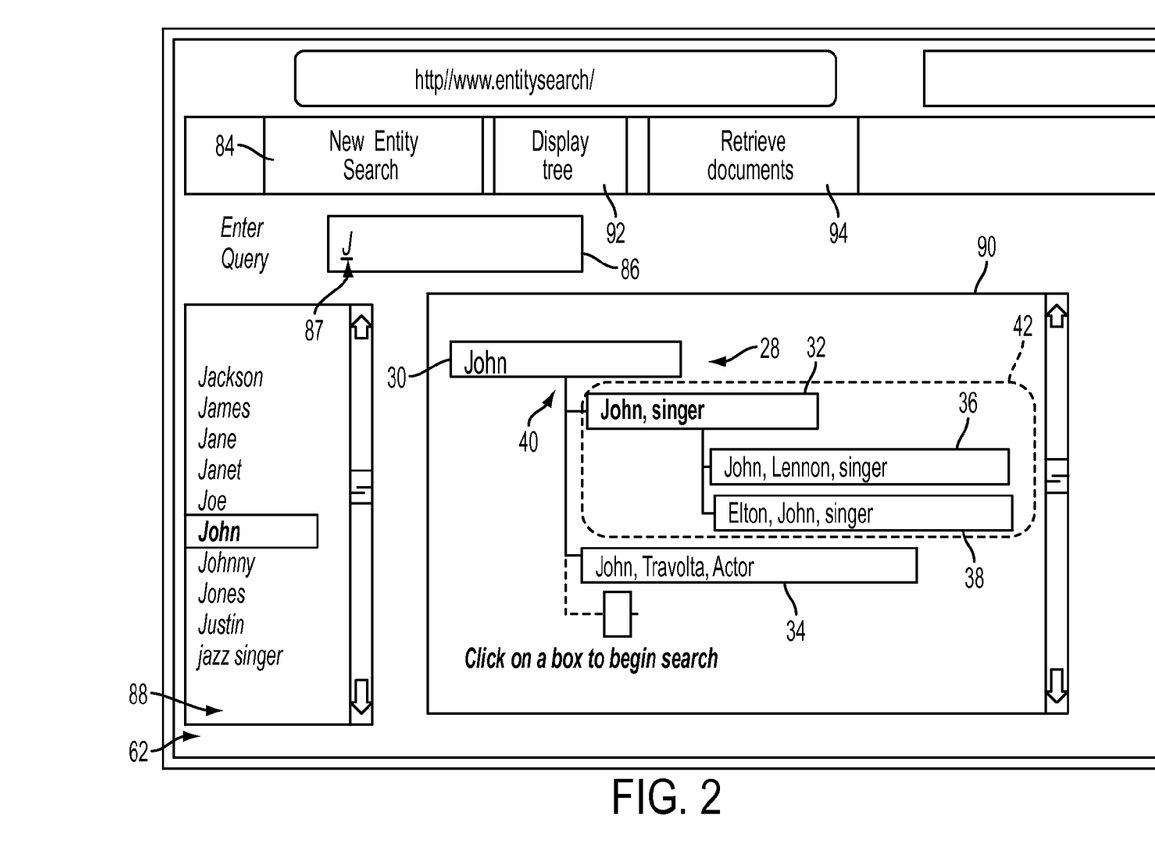
FIG. 2 is a screen shot of a web browser during formulation of a user's query.

FIG. 1 also summarizes a search process. When the user wants to search for documents related to an entity within the corpus 10, he first starts to input a text string 23 referring to a term describing the entity he is looking for, e.g., by typing, voice input, or the like. During entity suggestion 24, each time the user types/inputs a character, all terms matching the user input are identified. Retrieval of terms may be as described in above-mentioned U.S. Pub. No. 2009/0106224. Subsequently, during a refinement stage 26, a user is able to refine the search by navigating a refinement tree 28 which is displayed to the user, as illustrated in FIG. 2.

The user's refined query corresponds to a set of terms that cluster all the entity structures 22 sharing these terms. Specifically, since each term is associated to a set of indexed entity structures, the term can be seen as an entry point to a cluster of entity structures that share this common term as a description. The illustrated refinement tree 28 is built from the retrieved entity structures and may include a root or parent node 30 and a set of child nodes 32, 34, 36, 38 etc. Leaf nodes 34, 36, 38 terminate paths 40 from the root node 30, which may pass through one or more higher level nodes, such as node 32. A user-selected entity cluster 42 can be used as the basis of a search 44 (FIG. 1) of the document corpus 10, by using the document index 20 to identify those documents in the corpus which match the entity structures 22 grouped within the cluster 42. The user can at any time decide to further type text in order to improve the displayed suggestions or select one of the suggested nodes. In the latter case, the cluster of entities related to the selected node is used in the search 44. The user can also navigate the tree and visit sibling and parent nodes of a selected node. For example, the user may click on the node {John, singer} 32 to review its child nodes 36, 38, and if these are not of particular interest, review a sibling node of node 32, such as node 34.

Figure 3:
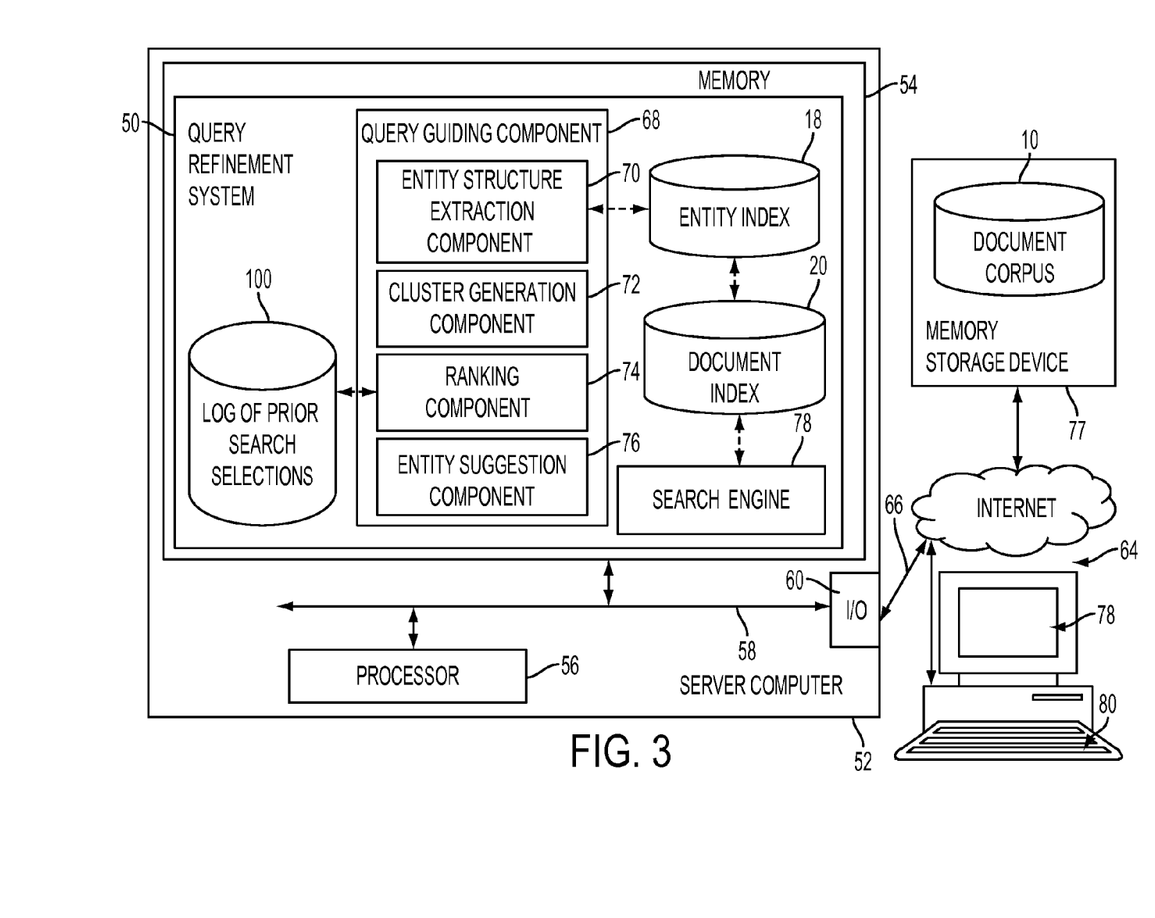
FIG. 3 is a schematic view of one embodiment of the query refinement system of FIG. 1 hosted by a server computer.

FIG. 3 illustrates an exemplary system 50 which may be used for performing the query refinement method. The illustrated query refinement system 50 includes one or more computing devices 52 comprising memory 54 and a digital processor 56 which are linked by a data/control bus 58 to each other and to one or more input/output interfaces 60 for communicating with external devices, and, in particular, for receiving a query input by a user. A user interacts with the system 50 via a user interface, such as a web interface 62 (FIG. 2) hosted by a client device 64. The client device 64 can be a computing device such as a desktop computer, laptop computer, PDA, cell phone with internet capability, or the like and can be linked to the system 50 via a wired or wireless connection 66, such as a local area network or wide area network such as the Internet.

The exemplary system 50 includes a query guiding component 68 which includes an entity structure extraction component 70, an entity cluster creation component 72, a ranking component 74 and an entity suggestion component 76. The components 70, 72, 74, 76 may be in the form of hardware or a combination of hardware and software and may be separate or combined. In the exemplary embodiment, the components 70, 72, 74, 76 are in the form of software instructions stored in memory 54 and executed by processor 56. These components are best understood with reference to the method described below. Briefly, the entity structure extraction component 70 identifies entity structures which match a user's input query. The entity cluster creation component 72 generates a cluster hierarchy. The ranking component 74 ranks the clusters in the hierarchy. The entity suggestion component 76 suggests terms from the extracted entity structures for refining the query. In particular, the suggestion component presents a tree structure 28 based on the cluster hierarchy in which most highly ranked nodes appear at the top.

The system 50 is linked to a repository 77, such as one or more memory storage devices, in which the document corpus 10 is stored. A search engine 78 retrieves a set of documents from the corpus which are responsive to the refined query.

Computing device 52 may take the form of one or more computing devices, such as a general purpose computer or dedicated computing device, such as a desktop or laptop computer, PDA, web-based server, network server, or the like. The exemplary processor 56 controls the overall operation of the computer device 52 by execution of processing instructions which are stored in memory.

The memory 54 can include random access memory (RAM), read-only memory (ROM), a hard disk, optical disk, combinations thereof, and the like, and may be physically located in the same computing device or parts thereof may be accessible to the computing device, e.g., via a local area network or the Internet. The digital processor 56 can be variously embodied, such as by a single-core processor, a dual-core processor (or more generally by a multiple-core processor), a digital processor and cooperating math coprocessor, a digital controller, or the like.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The client device 64 may include a display 78, such as an LCD screen or computer monitor and a user input device 80 for entering a query e.g., by typing or voice input, and for selecting refinements to the query proposed by the system. Suitable input devices 80 may include a keyboard, keypad, touch screen, cursor control device, microphone and voice to text converter, or combination thereof.

As shown in FIG. 2, the web interface 62 includes a search initiation button 84 which initiates the guided search when the user actuates it. A query field 86 displays the user's query 87 as it is input. Optionally, a list area 88 lists the terms of entity structures, and/or nodes that are responsive to the input query. A display area 90 displays the tree structure 28 in which a selected cluster 42 may be highlighted. Area 90 can be brought up on the web interface 62 when the user actuates a "display tree" button 92 or may be generated automatically as the user types. When a user has decided which cluster should form the basis of the search, the user may initiate the search, e.g., by double clicking on the highest level node in the cluster and/or by clicking a search button 94.

Figure 4:
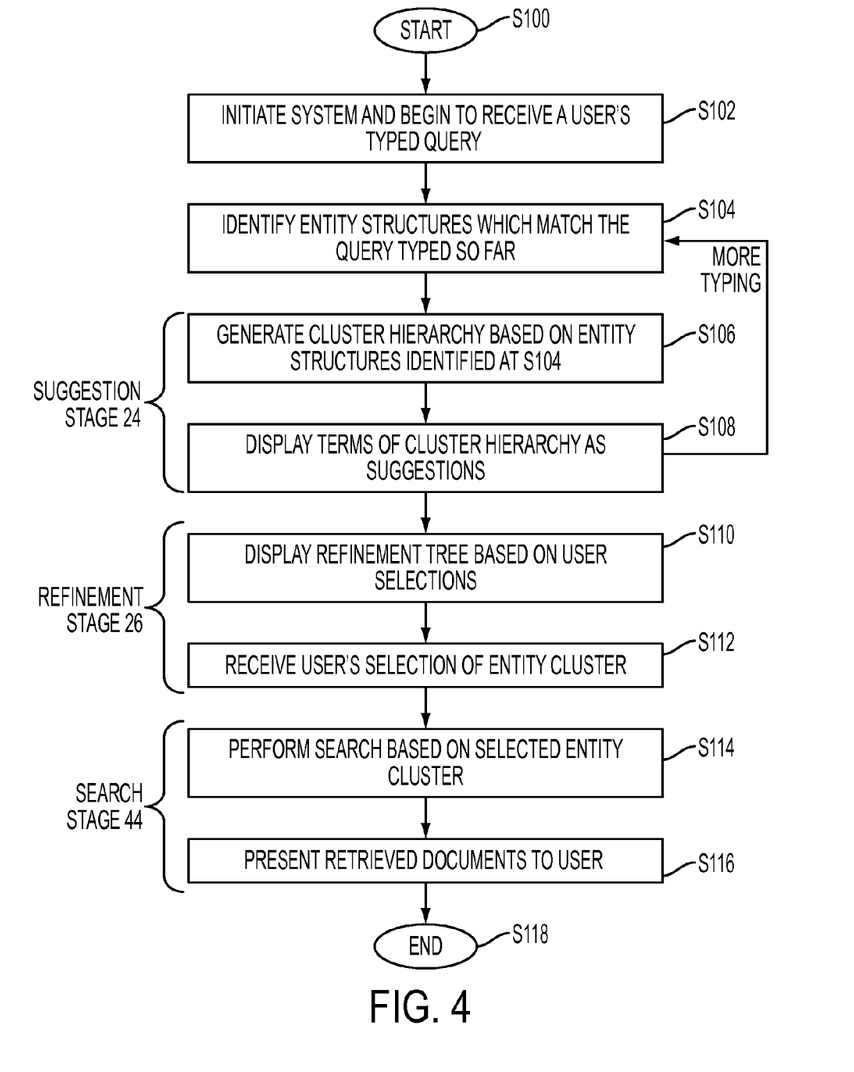
FIG. 4 is a flow diagram illustrating an exemplary query refinement method.

FIG. 4 illustrates a method of guided search which can be performed with the exemplary system 50 and user interface 62. The method begins at S100.

At S102, the system 50 is initiated and begins to receive a user's query 87. Specifically, the user starts typing, or otherwise inputting one or more words that characterize the entity for which he is looking, such as an entity name or an attribute of the entity in the query field 86.

At S104, the entity extraction component 70 generates a list of entity structures, based on the text 87 already typed. For example, for each character typed, the sequence of characters already input by the user is used to query the entity index 18 to identify entity structures 22 which include at least one term which matches the typed query 87. The system may wait for a while until the user has typed sufficient characters for a meaningful list to be generated or may refine the entity index query as each additional character is typed.

At S106, the cluster generation component 72 generates a cluster hierarchy 98 (FIG. 5) based on the list of entity structures generated at S104 and the user's query. Ranking may be utilized in arranging the cluster hierarchy to present suggestions for query refinement. At S108, suggestions, such as a list of terms 88, e.g., corresponding to first level nodes of the hierarchy, may be displayed to the user in a ranked order as the user is typing, to facilitate selection of terms.

At S110, at least a portion of the cluster hierarchy is displayed to the user on the display 80 in the form of a refinement tree 28. The user can use the structure of the refinement tree 28 to explore an entity cluster initially selected. Traversing a path of the tree corresponds to adding terms in the entity structure and therefore to refining the definition of the searched entity. When the user decides that one node of the tree defines the searched entity adequately, the user can select it, e.g., by clicking on the highest level node in the cluster.

At S112, a user's selection of a cluster 42 is received by the system 50 and input to the search engine 78.

At S114, the search engine 78 uses the entity cluster corresponding to the user-selected node to perform the search of the document corpus 10, e.g., by accessing the document index 20 to identify documents in which the entity structures in the selected cluster are found.

At S116, a set of documents 12, 14 is returned as responsive to the search and may be presented to the user, e.g., as a ranked list together with extracts in which the terms corresponding to the entity structure(s) are highlighted.

The method ends at S118.

The dynamic suggestion of entity clusters of the exemplary embodiment offers an interaction which is similar to the dynamic suggestion of queries in traditional keyword based search engines.

The method illustrated in FIG. 4 may be implemented in a computer program product that may be executed on a computer. The computer program product may be a computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 4, can be used to implement the method for refining entity-based queries.

Further details of the system and method are now discussed.

1. Entity Index Querying (S104)

Valid entity structures 22 are those that are indexed by all the words already typed by the user or by words beginning with what is being typed. For example, in the context of a show business corpus, if the user has typed the letter "j", typical retrieved results will include entities like {John, Lennon} and {Joe, Cocker} but also {Michael, Jackson} and any other entity structure defined with one attribute starting with "j". In order to implement the filtering of the entity index, the user entry is tokenized into words, or the prefix of a word for the rightmost part. For example, the input "John mus" will be tokenized into the word "John" and word prefix "mus". These words, if entire words, are then lemmatized. Finally a search is performed over the entity index to identify matching entity structures. Specifically, every entity structure that contains the set of words (or word prefix) of the query (or, more specifically, has the same lemma form) is returned as the results of the search.

2. Suggestions for Query Refinement Based on Matching Entity Structures (S108)

The set of entity structures retrieved as a result of a user query may be displayed below the typing area (e.g., in box 90 and/or list 88) so that at any time, the user can pick one of the suggestions to shorten the typing. Unlike conventional query suggestion, however, the entity structures are not displayed as a flat ranked list but as a ranked hierarchy of clusters of entities. If there is only one single John, one Joe, and one Jackson in the index, each entity is displayed as a separate suggestion to the user. However, if several entities share the same matching word, e.g. {John, Lennon} and {John, Travolta}, they will be displayed in a single line (e.g., in list 88) as John representing the cluster of all entities named John. Using the example of a show business corpus, assume that the query "j" retrieves the following entities: {John, Lennon, singer}, {John, Travolta, actor}, {Joe, Cocker, singer}, {Elton, John, singer}, and {Michael, Jackson, singer}. Once the user has typed a word and is typing a second one, like for example "john sing", valid suggestions will be entity structures including a term that includes John as its first or only word, but also a term starting with sing. Thus, entity structures like {John, Lennon, singer} and {Elton, John, singer} are retrieved that could be grouped in this case into a single suggestion (John, singer).

3. Generation of a Cluster Hierarchy (S106)

Suggestions of entity structures 22 matching a user input are first clustered together according to the terms they have in common and then displayed using a hierarchical view of the clusters. The creation of this hierarchical structure 98 (FIG. 5) from the flat list of retrieved entity structures is performed in two steps: a) creation of clusters and b) creation of a hierarchy of clusters.

a. Creation of Entity Clusters (S106*a*)

An entity cluster corresponds to a set of entity structures that share one or more of their terms. More precisely, an entity cluster comprises:

a) a set of one or more entity structures, b) a set of terms that are shared by all the entity structures of the entity cluster, and c) a set of parent clusters and a set of child clusters which are used to model the hierarchy between the clusters.

Parent clusters are entity clusters which have at least one less term in the set of shared terms. Child clusters are entity clusters which have at least one more term in the set of shared terms. For some entity clusters, either the set of child clusters or the set of parent clusters may be empty.

Once a set of entity structures 22 matching the user input has been retrieved from the entity index 18, the entity clusters are constructed as follows.

Each retrieved entity structure 22 is considered as the set of its terms. A pair-wise processing of the entity structures is performed. Specifically, for each pair, the intersection of the sets of terms is computed. If this intersection is not empty and contains at least one of the terms matching the user's input query, the pair is identified as a candidate entity cluster comprising the two entity structures. If this entity cluster is not already in existence, a new entity cluster is created with the identified intersection as the set of terms and the two entity structures as the set of entity structures. If the candidate entity cluster already exists, the new entity structure(s) is/are added to its set of entity structures.

When the pair-wise processing is over, an additional entity cluster is created for each entity structure where the set of entities of the cluster is a single entity structure and its set of terms is the set of terms of the entity structure. These final (terminal) entity clusters will constitute the leaves 34, 36, 38 of the hierarchy.

For example, consider the five entity structures retrieved by the query "j": {John, Lennon, singer}, {John, Travolta, actor}, {Joe, Cocker, singer}, {Elton, John, singer}, {Michael, Jackson, singer} in the example above. An entity cluster A may first be created with the pair of entity structures {John, Lennon, singer} and {John, Travolta, actor}, the set of terms in common comprising the single term John. When the entity structure {Elton, John, singer} is compared with {John, Lennon, singer}, a new entity cluster B is created with the set of terms in common being John and singer and having A as its parent cluster. When the entity structure {Elton, John, singer} is pair-wise compared with {John, Travolta, actor} the intersection is the single term John. The entity structure {Elton, John, singer} is then added to the existing entity cluster A.

Accordingly, from these five entity structures, seven entity clusters are created:

A: an entity cluster "John" with the three entity structures including John.

B: an entity cluster "John, singer" with the two entity structures containing both John and singer.

C-G: five leaf clusters corresponding to the individual entity structures.

No candidate entity cluster "singer" is created in this example, because singer does not match the query "j".

It will be appreciated that since the type of term is not considered, the candidate entity clusters can be constructed not only around the proper nouns/named entities forming terms of the entity structure but also on any term identified in the parsing stage as being descriptive of the corresponding entity. In some cases, a term which is a descriptive expression for one entity structure can be a term which is a proper noun for another of the entity structures in the same entity cluster. For example, if the user's input query is "pr", two entity structures {President, camembert} and {Jane Doe, President, CEO} may be retrieved from the entity index and these two entity structures will be grouped into a single cluster "President".

At the end of this step, all the initial entity structures are associated with at least one entity cluster.

b. Creation of Cluster Hierarchy (S106*b*)

The entity clusters created during S106*a* serve as the nodes of the cluster hierarchy presented to the user and facilitate the refinement of the query. In order to create the cluster hierarchy, the entity clusters are first sorted by size. Here, size is defined by the number of terms in the set of terms for the entity cluster.

The system then iterates over the list of clusters from size n to 2, where n is the size of the largest entity cluster. Each cluster C1 of the sorted list is compared with any cluster C2 of smaller size. If C1 is included within C2 (i.e., its set of terms is a subset of the set of terms of C1) and C1 is not included in any of the already found parents of C2 then C1 becomes the parent of C2.

Using the parent-children relationship defined in this iteration, a hierarchy of clusters is generated.

Figure 5:
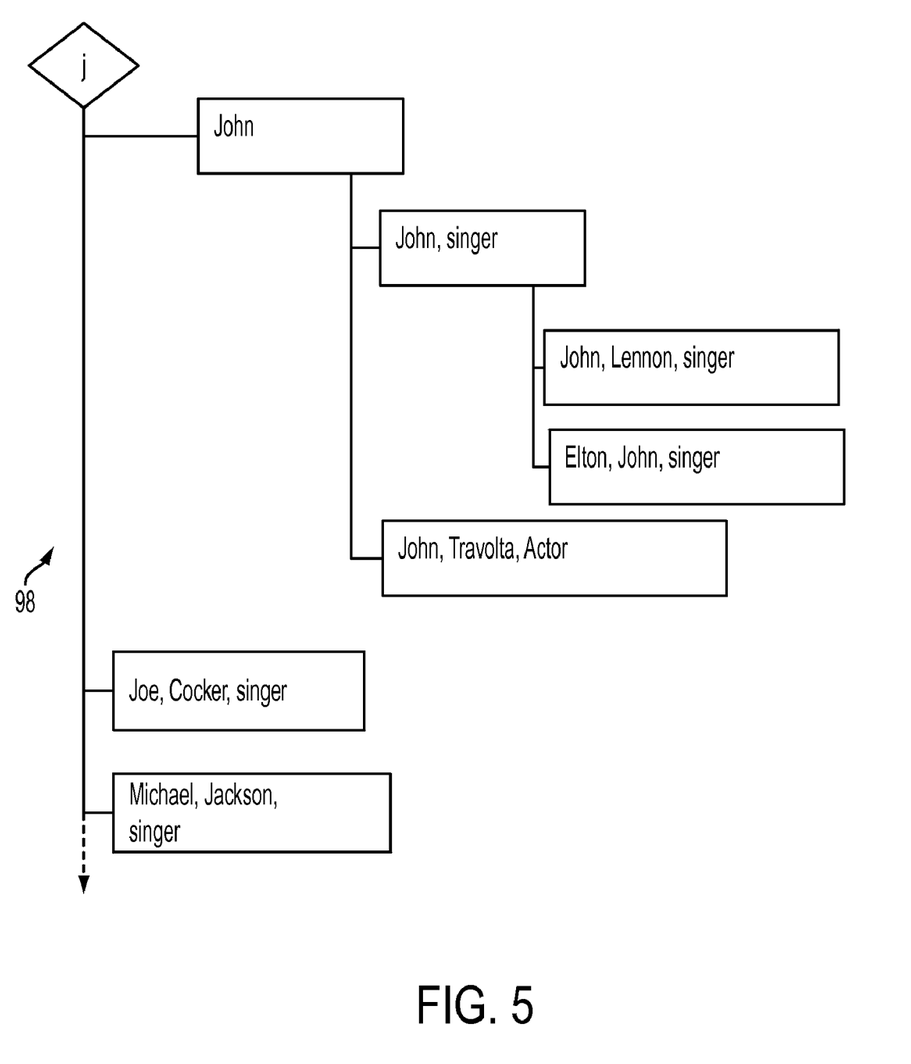
FIG. 5 illustrates an exemplary entity hierarchy.
Figure 6:
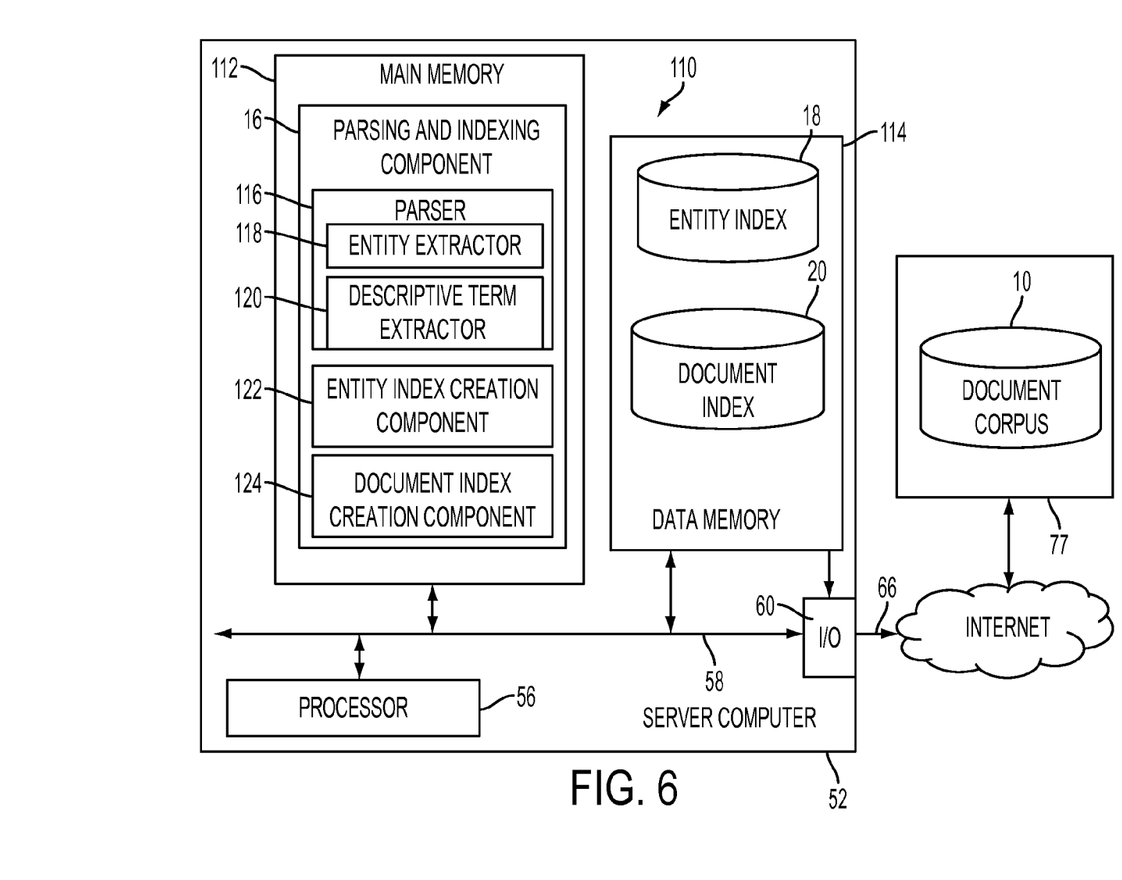
FIG. 6 illustrates a system for creation of the exemplary entity index.

Using the seven entity clusters described in the example above, the cluster hierarchy 98 for the user input "j" shown in FIG. 5 is obtained.

Ranking Criteria

In the exemplary embodiment, ranking is used to present entity structure suggestions (S108) and to generate a cluster hierarchy arrangement which is expected to be most useful to the user. Ranking may thus be performed by ranking component 74 in S108, S110 as follows:

Ranking of the terms to be used for the suggestions at S108. At this stage, just the first level nodes of the cluster hierarchy may be presented as suggestions, which are ordered according to rank.

Ranking of the nodes within each branch of the refinement tree to be presented at S110. At this stage, a portion of the cluster hierarchy around a selected node is displayed as a refinement tree including parent and child nodes and optionally some sibling nodes (nodes with the same parent as the user-selected node) in which the order displayed is according to a ranking.

Both rankings can be obtained by associating a score to each term that can be computed from one or a combination of two factors: a) an intrinsic importance, and b) prior user feedback.

a) Intrinsic Importance of the Term in the Corpus

This factor is based on the assumption that terms that define a named entity/proper noun and that are frequently used in the considered corpus 10 are probably linked to a named entity that is known in the domain associated to that corpus. They are therefore more likely to be the subject of a search in many applications. This factor can be computed as follows.

In the case of terms defining first level nodes of the tree and matching the user input, such as node 30 in the case of the query "john", the frequency of the term in the corpus 10 can be considered in ranking these nodes. The frequency may be defined as a ratio of the number of occurrences of the term John in the corpus to the sum of occurrences of the terms defining the other first level nodes of the tree (which could be terms like Johnny or Johnson, or multi-words terms containing John).

In the case of terms defining lower level nodes of the tree (i.e., nodes having a parent cluster node), such as for node 32 or 36, in addition to or instead of the corpus frequency, the frequency can be computed as the number of times the term occurs in conjunction with a term defining the parent node relative to the number of times the parent node term occurs in the corpus. For nodes which have more than one term in the set of terms, a function based on the two term frequencies can be computed, e.g., a product.

In some embodiments, a finer scoring of the terms can be obtained which leverages the output of the indexing. In one method, a deep analysis of syntactic relationships is performed in creating the entity index (described in greater detail below) in order to establish connections between expressions which can serve as terms and provide absolute and relative frequencies of the expressions, extracted over large and external corpora.

In addition, if the terms are labeled by type (e.g., entity or descriptive), this enables a differentiation between entity terms (e.g., Arnold Schwarzenegger) and descriptive terms which describe a feature of the named entity (e.g., actor, governor). This can be used as an additional parameter for the scoring. Descriptive terms may be a more useful way to score entity clusters as compared to proper nouns. The latter are more heterogeneous and variable. Descriptive terms could therefore be ranked higher than entity terms in ranking entity clusters at levels above the leaves. However, in the case where some entity structures are part of an entity cluster because of a term which is a proper noun and other entity structures share this cluster by virtue of a descriptive term, the entity structures using the expression as a proper noun could be ranked higher in the children nodes of the cluster on the basis that the proper noun is considered as a stronger qualifier of the entity structure.

To illustrate this with an example, if a user were to type the query "s", in the first level of the suggestion tree 28, the term singer will appear before the term Smith. However once the node {singer} has been selected, the child node related to a person named John Singer will appear before any other nodes related to anyone being a singer.

b) Collective Feedback from Previous Search Sessions

Knowledge of users' selections of entity structures and terms in past search sessions can be used in order for the system to boost the entity clusters of the hierarchy that have been the most frequently selected (e.g., rank them more highly than would be the case based on the ranking in (a)). In one embodiment, a log 100 of prior search selections may be stored in memory 54, which is accessed by the ranking component 74 (FIG. 3).

In the case of first-level nodes matching the user input, one possible collective feedback ranking maybe performed by storing the number of times the node or term was selected in past sessions and ranking the nodes based on the numbers for each node.

In the case of lower level nodes of the tree, the ranking component 74 can store the number of times the expression introduced by the node was selected in the context of the given parent expression.

When the system 50 is applied in a context where the search needs are evolving over the time, the counting of usage can be modified by an aging function. Each time a user selection is recorded, or on a periodic basis, the system multiplies all the usage counters by an obsoleteness factor which should be lower than but close to 1. This recurrent application of the factor will lower the weight of selections that happened a long time ago in the overall distribution of the term's usage.

A score for each node can then be computed on the basis of the frequencies of selection of each term. In some embodiments, the counting can also be separated according to each user, user profile, or group of users. The score computation, in this case, may be a weighted sum of the different frequencies. These weights can be defined or trained per application or could be tuned by the end-user, e.g., by providing the user with a check box to tell the system to consider only personal usage or to consider collective usage during the ranking.

The two ranking criteria described in a) and b) above can be combined in order to obtain a global score and to rank the nodes according to this score.

In general, the feedback from previous search sessions can only provide meaningful results after a number of prior selections have been recorded. The second ranking criterion may therefore not been used during an initial phase until the number of selections recorded reaches a threshold where the data collected are judged to provide significant distributions. Once the system 50 has been used for a while, information from previous search sessions can be used for adjusting the score of the terms according to the frequency of the selections made by other users in the past. Therefore, the most popular terms or nodes are boosted to the top of the list since they are more likely to be used.

Generation of the Entity Index 18 and Document Index 20

For domain dependent applications, such as litigation for example, it is particularly useful to have a corpus-dependent and dynamic construction of the entity index 18, since the searched information is not necessarily available in lexical or encyclopedic resources.

FIG. 5 illustrates an exemplary system 110 for generating the entity and document indexes 18, 20. The system 110 may be similarly configured to system 50 of FIG. 3, except as noted, and may be hosted by the same or a separate server computer 52. The system 110 includes memory, such as main memory and data memory 112, 114 and a processor 56. The parsing and indexing component 16, briefly described with reference to FIG. 1, may be in the form of software instructions stored in main memory 112 and executed by processor 56. The exemplary parsing and indexing component 16 includes a parser 116 which annotates the text strings of the documents 12, 14 in corpus 10 with tags (labels) which correspond to grammar rules, such as lexical rules, syntactic rules, and dependency (semantic) rules. The lexical rules define relationships between words by the order in which they may occur or the spaces between them. Syntactic rules describe the grammatical relationships between the words, such as noun-verb, adjective-noun. Semantic rules include rules for extracting dependencies (subject-verb relationships, object-verb relationships), named entities and proper nouns, and co-reference links.

In some embodiments, the parser 116 comprises an incremental parser, as described, for example, in above-referenced U.S. Pat. No. 7,058,567; Aït-Mokhtar, et al., "Incremental Finite-State Parsing," Proceedings of Applied Natural Language Processing, Washington, April 1997; and Aït-Mokhtar, et al., "Subject and Object Dependency Extraction Using Finite-State Transducers," Proceedings ACL '97 Workshop on Information Extraction and the Building of Lexical Semantic Resources for NLP Applications, Madrid, July 1997.

Of particular relevance to the exemplary system and method are an entity extractor 118 and descriptive term extractor 120 which extract the entities and descriptive terms which characterize them, respectively. These components may be in the form of rules written on top of the conventional rules of the parser 116 in a suitable programming language, such as Python. In other embodiments, the system may take as input a pre-parsed document corpus and simply extract the labeled entities and identify the descriptive terms which characterize them.

Briefly, the parser 116 tokenizes each text string in the document corpus to form a sequence of tokens (words, numbers, punctuation, etc.) where a token is a sub-sequence of characters. Morphological rules assign parts of speech to each recognizable word token (indefinite article, noun, verb, etc). Ambiguous words may be semantically disambiguated using the method described in U.S. Pat. No. 6,405,162, incorporated herein by reference.

The entity extractor 118 identifies text fragments corresponding to named entities including persons, dates, monetary expressions, locations, percentages, legal references, and the like. Additionally, the entity extractor extracts proper nouns which serve the function of nouns in the text strings but which are not identified as common nouns. The extraction of named entities may be performed with pre-compiled lists of entities (e.g., a list of person names, places etc.), which may be accessed from an online resource, such as WordNet™. For proper nouns not recognized as named entities, contextual local grammar rules may be used to identify them. Coeference rules may be used to tag appropriate pronouns, such as he, her, it, etc. with a tag corresponding to the referenced extracted entity.

Word sense disambiguation for named entities and proper nouns may be performed using the methods described in one or more of U.S. Pub Nos. 2008/0319978, 2009/0089047 and 2009/0094019, the disclosures of which are incorporated herein by reference in their entireties.

The descriptive term extractor 120 extracts semantic relations (syntactic dependencies, e.g., subject-object, subject-verb, object-verb, complements) between the extracted named entities/proper nouns and other tokens or groups of tokens in the strings.

In the exemplary method, syntactic parsing of the text enables identification of the relevant and productive relations between a proper noun/named entity and its semantic label. For example, the entity Boeing may be associated with the label "aircraft", while the entity Ford is associated with the labels "vehicle", "president", "car", "share", etc. (to the extent that these descriptive terms appear in attributive or other extracted relationships in the corpus). The frequencies of the labels may also be counted. The exemplary descriptive term extractor also keeps track of the different "semantic facets" with which an entity can be associated. For example, entity Arnold Schwarzenegger may be associated with the label "governor" in one document and the label "actor" in another, depending on the context of the document, which is useful when searching for specific information.

Appropriate relations for the extracted entities are extracted (for example attribute or modifier relations). For example, from the sentence: "George Wilson is an extremely popular president", the relation Entity (George Wilson)→Attribute(President) can be extracted. For the sentence "The Philadelphia Coca-Cola bottling company had a record year", the relation Modifier(Company)→Entity(Coca-Cola) can be extracted.

For each of these dependencies, the predicate is a potential semantic label that is a candidate descriptive term, and the argument a candidate entity term. A matrix, where each line is a potential descriptive label and each column is a potential entity, can then be built. The value of each intersection corresponds to the frequency of the relation within the corpus, e.g., as shown in the table.

|  | Wilson | Coca-Cola | ... |
| --- | --- | --- | --- |
| president | 1.1 | 1.2 | ... |
| company | 2.1 | 2.2 | ... |
| ... | ... | ... | ... |

Automatic screening of this preliminary resource can be performed to remove potential descriptive labels with an anomalous set of characters (&, @ signs, . . . ), and relations with very low frequencies.

The remaining descriptive labels and corresponding entities in the matrix are formulated into entity structures and indexed by the entity index creation component 122. The document index creation component 124 generates a document index 20 which links the entity structures 22 to the documents in which they are found (i.e., from which they were extracted).

It will be appreciated that the parser 116 may identify other information from the text strings than that specifically listed herein. Although not limited to the following, some of the functions provided by the parser may include: deep parsing (extracting syntactic dependencies between distant words); robust parsing: syntactic analysis of unrestricted text (real-life documents); sentence, paragraph or whole text level analysis; a multi-input parser, including XML input/output format; incremental organization of linguistic processes; contextual selection and marking; chunking (from a list of words to a chunk tree); dependency calculus (from a tree to dependencies); different types of rules operating on the output of the preprocessing unit; contextual selection (disambiguation); local rules for named entity recognition; chunking; dependency calculus; syntactic dependencies; normalization (including thematic roles); and co-reference extraction. The parser described herein thus provides a very powerful and robust tool to perform fine grained term extraction. However, it is also contemplated that the parser may provide a more limited set of functions.

The systems and method described herein enable a ranked and hierarchical clustering of named entities to be dynamically constructed, based on the expressions that are associated with named entities extracted from a corpus and that match a user's query. The clustering can be displayed to the user and used in support of the generation of a query in the context of a named entity search.

The exemplary method and query refinement system are applicable to the litigation domain. The system may also be incorporated into an existing search tool, for example to aid lawyers in searching a collection of documents related to a legal case. In such a tool, the system could be used to search directly for the entities or as a sub-selection method as a part of a more articulated query.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for refining a user's query for entity-based searching comprising:
   providing an entity index generated from a corpus of documents, the entity index comprising a set of entity structures, each entity structure comprising a plurality of terms, each of the terms of an entity structure being a feature of a same entity;
   receiving an input user's query;
   retrieving, from the entity index, entity structures which match the user's query, each of the retrieved entity structures comprising at least one term which matches at least a part of the user's query;
   identifying clusters of the retrieved entity structures which have at least one of their terms in common;
   generating a cluster hierarchy from the identified clusters in which nodes of the hierarchy are defined by at least one the terms of the retrieved entity structures and in which a parent node includes fewer terms of an entity structure than each child node of the parent node and wherein there are sibling nodes which are the child nodes of the parent node; and
   presenting at least a portion of the cluster hierarchy to the user as a refinement tree for facilitating refinement of the user's query through user selection of a node of the refinement tree which, when formulated as a search, retrieves one or more responsive documents from the corpus of documents.

2. The method of claim 1, wherein at least one of the retrieving, identifying, generating, and presenting is performed by a processor of a computing device.

3. The method of claim 1, wherein the terms of each entity structure are selected from person name, article name, organization name, descriptive term, and combinations thereof.

4. The method of claim 3, wherein the descriptive terms are extracted from the documents in the corpus by natural language processing which identifies attributes of entities.

5. The method of claim 1, wherein each entity comprises a proper name or named entity extracted from the document corpus.

6. A method for refining a user's query for entity-based searching comprising:
   providing an entity index generated from a corpus of documents, the entity index comprising a set of entity structures, each entity structure comprising a plurality of terms, each of the terms of an entity structure being a feature of a same entity;
   receiving an input user's query;
   retrieving, from the entity index, entity structures which match the user's query, each entity structure comprising at least one term which is at least a part of an extracted named entity;
   identifying clusters of the retrieved entity structures which have at least one of their terms in common;
   generating a cluster hierarchy from the identified clusters in which nodes of the hierarchy are defined by at least one the terms of the retrieved entity structures; and
   presenting at least a portion of the cluster hierarchy to the user as a refinement tree for facilitating refinement of the user's query through user selection of a node of the refinement tree which, when formulated as a search, retrieves one or more responsive documents from the corpus of documents, wherein the presented cluster hierarchy includes a representation of a cluster of named entities wherein the nodes include a parent node and child nodes of the parent node in which the parent node includes a term which is one of a first name and a last name of a named entity and the child nodes include an additional term which is another of the first name and last name of a named entity.

7. The method of claim 6, wherein when the entity is a person, at least one term of the entity structure is at least one of a first name, a last name, and a nickname of the person.

8. The method of claim 1, wherein for at least some of the entity structures in the entity index, at least one of the terms is a descriptive term.

9. The method of claim 8, wherein at least some of the descriptive terms in the entity index are each extracted as an attribute of a respective entity in a respective text string of a document in the corpus.

10. The method of claim 1, wherein the generating of the cluster hierarchy further includes ranking nodes of the cluster hierarchy, whereby nodes which are ranked more highly are presented to the user in a more prominent position in the presented refinement tree.

11. The method of claim 10, wherein the ranking is based on at least one of:
   a frequency of the node's terms in the document corpus; and
   a frequency of a node's term in combination with a parent node's term, in a same text string, in the document corpus.

12. The method of claim 11, wherein the ranking is also based on relative frequencies of selection of the nodes by prior users.

13. The method of claim 1, wherein the generating of the cluster hierarchy from the identified clusters includes, for each entity cluster, identifying whether there is a parent entity cluster and, where a parent cluster exists, linking the entity cluster to its parent cluster, and wherein the presenting includes displaying the links between entity clusters to the user as paths of the refinement tree.

14. The method of claim 1, wherein the presenting includes displaying a group of entity clusters as a tree structure in which links between clusters are displayed as paths.

15. The method of claim 14, wherein in the tree structure, entity structures serve as leaves of the tree structure which each are linked to another entity cluster in the tree structure by a path.

16. The method of claim 1, wherein the identifying of clusters of retrieved entity structures comprises pairwise comparing of the retrieved entity structures, whereby when a pair of entity structures has at least one term in common, which at least one term matches at least a part of the user's query, a new cluster is created, if not already in existence, which includes the pair of entity structures and the set of terms which they have in common, and where a cluster is already in existence having the set of terms which the pair of entity structures have in common, the pair of entity structures is added to the existing cluster.

17. The method of claim 1, wherein the method further includes generating the entity index comprising:
   natural language processing of the documents in the document corpus to identify entities and, where present in a text string with the extracted entity, a descriptive term; and
   combining the extracted entity and, where extracted, the descriptive term from the text string to form an entity structure in which the entity supplies at least one of the terms;
   indexing at least a portion of the extracted entity structures according to their terms.

18. The method of claim 1, further comprising generating a document index which links entity structures with corresponding documents in the document corpus.

19. A system for guiding a user in refining a query for entity-based searching, comprising:
   memory which stores instructions for performing the method of claim 1; and
   a processor in communication with the memory which executes the instructions.

20. A computer program product comprising
   a non-transitory recording medium encoding instructions which, when executed by a computer, perform the method of claim 1.

21. A system for guiding a user in refining a query for entity-based searching, comprising:
   an interface for receiving a query input by a user;
   an entity index which links each of a set of entity structures to terms of the entity structure;
   an entity structure extraction component which retrieves entity structures from the entity index based on the user query;
   a cluster generation component which, for retrieved entity structures comprising at least one term which matches the user query, identifies entity clusters, each of the entity clusters comprising a set of terms comprising one or more terms of at least one retrieved entity structure, a set of the retrieved entity structures, a set of parent clusters, and a set of child clusters;
   a ranking component which ranks the identified entity clusters;
   an entity suggestion component which proposes a set of the ranked clusters as a refinement tree linked by paths to their parent and child clusters and wherein a parent cluster in the proposed set includes fewer terms of an entity structure than each child cluster of that parent cluster and wherein there are sibling clusters which are the child clusters of the same parent cluster; and
   a processor which implements the entity structure extraction component, cluster generation component, ranking component, and entity suggestion component.

22. The system of claim 21, wherein a single one of the set of parent clusters and the set of child clusters for an entity cluster is optionally an empty set.

23. A method for guiding a user in refining a query for entity-based searching, comprising:
   receiving a query input by a user;
   with a processor of a computing device, querying an entity index based on the user's query to retrieve entity structures, each of the retrieved entity structures comprising at least one term which matches at least a part of the user's query, the entity index linking each of a set of entity structures to a respective set of terms, each set of terms comprising a plurality of terms, at least some of the entity structures comprising both a first term which is a name or title of an entity and at least a second term descriptive of the entity;
   generating entity clusters from the retrieved entity structures, each of the entity clusters comprising a set of terms comprising one or more terms of at least one retrieved entity structure, a set of entity structures, a set of parent clusters, and a set of child clusters;
   ranking the identified entity clusters;
   generating a ranked cluster hierarchy in which sibling entity clusters are linked to their parent cluster and to child entity clusters;
   presenting at least a portion of the ranked cluster hierarchy as a refinement tree which is navigable by the user to refine the query, the refinement including adding terms of an entity structure by selecting one of the sibling clusters.

* * * * *